(12) United States Patent
Tarafder et al.

(10) Patent No.: US 11,143,634 B2
(45) Date of Patent: Oct. 12, 2021

(54) SYSTEMS, DEVICES, AND METHODS FOR CONTROLLING THE TEMPERATURE OF A CO2 PUMP

(71) Applicant: Waters Technologies Corporation, Milford, MA (US)

(72) Inventors: Abhijit Tarafder, Franklin, MA (US); Jason Hill, Milford, MA (US); Joshua Shreve, Acton, MA (US)

(73) Assignee: Waters Technologies Corporation, Milford, MA (US)

( * ) Notice: Subject to any disclaimer, the term of this patent is extended or adjusted under 35 U.S.C. 154(b) by 474 days.

(21) Appl. No.: 16/171,826

(22) Filed: Oct. 26, 2018

(65) Prior Publication Data

US 2019/0376936 A1 Dec. 12, 2019

Related U.S. Application Data

(60) Provisional application No. 62/578,056, filed on Oct. 27, 2017.

(51) Int. Cl.
*G01N 30/32* (2006.01)
*F04B 39/06* (2006.01)
(Continued)

(52) U.S. Cl.
CPC ........... *G01N 30/32* (2013.01); *B01D 15/163* (2013.01); *F04B 39/06* (2013.01); *G01N 30/30* (2013.01); *G01N 2030/326* (2013.01)

(58) Field of Classification Search
CPC .. G01N 30/30; G01N 30/32; G01N 2030/303; G01N 2030/324; G01N 2030/326; B01B 15/163; B01B 15/40
See application file for complete search history.

(56) References Cited

U.S. PATENT DOCUMENTS

| 5,767,387 A | 6/1998 | Wang | |
|---|---|---|---|
| 2015/0129494 A1* | 5/2015 | Joudrey | B01D 15/40 210/635 |

(Continued)

FOREIGN PATENT DOCUMENTS

WO 2015175448 A1 11/2015

OTHER PUBLICATIONS

Instrumentation for Analytical Scale Supercritical Fluid Chromatography; Terry Berger; Journal of Chromatography A, 1421 (2015) 171-183 (Year: 2015).*

*Primary Examiner* — Nathaniel J Kolb
(74) *Attorney, Agent, or Firm* — Womble Bond Dickinson (US) LLP; Deborah M. Vernon; Heath T. Misley

(57) ABSTRACT

Methodologies, systems, and computer-readable media are provided for controlling the mass flow rate within a $CO_2$ based chromatography system. The pressure within a $CO_2$ pump is measured and received at a computing system, and the computing system retrieves a target temperature value corresponding to the new pressure measurement within the $CO_2$ pump. The computing system then generates a temperature control command that controls a $CO_2$ pump heater or cooler in order to achieve the target temperature value at the $CO_2$ pump. Thus, a target mass flow rate of $CO_2$ from the $CO_2$ pump is achieved by adjusting the temperature of the $CO_2$ pump in response to changes in pressure.

12 Claims, 4 Drawing Sheets

(51) Int. Cl.
*G01N 30/30* (2006.01)
*B01D 15/16* (2006.01)

(56) References Cited

U.S. PATENT DOCUMENTS

2016/0274071 A1* 9/2016 Yamamoto ............. G01N 30/32
2018/0078875 A1* 3/2018 Joudrey ................. G01N 30/32

* cited by examiner

SYSTEMS, DEVICES, AND METHODS FOR CONTROLLING THE TEMPERATURE OF A CO2 PUMP

CROSS-REFERENCE TO RELATED APPLICATION

This application claims the benefit of U.S. Provisional Patent Application No. 62/578,056 filed on Oct. 27, 2017 titled "SYSTEMS, DEVICES, AND METHODS FOR CONTROLLING THE TEMPERATURE OF A CO2 PUMP," the contents of which are incorporated herein by reference in its entirety.

TECHNICAL FIELD

The present disclosure relates to techniques for controlling parameters within carbon dioxide-based systems, such as, for example, a carbon dioxide based chromatography system. The present disclosure also relates to techniques for controlling the temperature of a $CO_2$ pump.

BACKGROUND

Chromatography involves the flowing of a mobile phase over a stationary phase to effect the separation of analytes of interest. To speed-up and enhance the efficiency of the separation, pressurized mobile phases were introduced. Carbon dioxide-based chromatography systems use $CO_2$ as a component of the mobile phase, and the $CO_2$ based mobile phase is delivered from pumps and carried through the separation column as a pressurized fluid. In systems using $CO_2$ as a mobile phase component, one challenge is maintaining a constant mass flow rate of $CO_2$ as the pressure in the $CO_2$ pump changes. Due to the high compressibility of $CO_2$, the density of $CO_2$, and therefore the mass flow rate, can change as the pressure within the $CO_2$ pump changes. Therefore, maintaining a consistent mass flow rate of $CO_2$ within a $CO_2$-based chromatography system raises a number of challenges caused by pressure changes within such a system and the compressibility of $CO_2$.

SUMMARY

Embodiments of the present technology disclose methods and systems for controlling the mass flow rate of $CO_2$ within a $CO_2$-based chromatography system by adjusting the temperature of a $CO_2$ pump. In some embodiments, the temperature of a $CO_2$ pump can be dynamically adjusted in order to compensate for changes in delivery pressure of the $CO_2$ pump in order to maintain a consistent mass flow rate or achieve a desired mass flow rate of $CO_2$.

In one aspect, the present technology relates to a method for controlling mass flow rate within a $CO_2$-based chromatography system. The method includes measuring a change in pressure within a $CO_2$ pump using a pressure sensor. The method also includes receiving a new pressure measurement at a computing system from the pressure sensor. The method also includes retrieving a target temperature value corresponding to the new pressure measurement from a database using the computing system. The method also includes generating a temperature control command using the computing system. The temperature control command is configured to control a $CO_2$ pump heater or cooler in order to achieve the target temperature value at the $CO_2$ pump. The method also includes achieving a target mass flow rate of $CO_2$ from the $CO_2$ pump by achieving the target temperature value at the $CO_2$ pump.

In this aspect of the present technology, the temperature control command can be configured to control a temperature of a coolant to the $CO_2$ pump. In addition or alternatively, the temperature control command can be configured to pre-cool a solvent within the $CO_2$-based chromatography system to a minimum target temperature, and adjust the $CO_2$ pump temperature to achieve the target temperature value using a $CO_2$ pump heater. In addition or alternatively, the temperature control command can be configured to cool the $CO_2$ pump using a coolant, and adjust the $CO_2$ pump temperature to achieve the target temperature using a $CO_2$ pump heater. In addition or alternatively, retrieving the target temperature value can include accessing a lookup table including $CO_2$ density values as a function of temperature and pressure. In addition or alternatively, the method can also include receiving a target mass flow rate at the computing system, wherein maintaining a constant mass flow rate includes maintaining the target mass flow rate of $CO_2$ from the $CO_2$ pump in response to the change in pressure within a $CO_2$ pump.

In another aspect, the present technology relates to a system for controlling mass flow rate from a $CO_2$ pump. The system includes a pressure sensor configured to measure a change in pressure within the $CO_2$ pump. The system also includes a computing system configured execute a temperature control module. The temperature control module is configured to receive a new pressure measurement from the pressure sensor. The temperature control module is also configured to retrieve a target temperature value corresponding to the new pressure measurement from a database. The temperature control module is also configured to generate a temperature control command configured to control a $CO_2$ pump heater or cooler in order to achieve the target temperature value at the $CO_2$ pump. The system also includes a $CO_2$ pump heater or cooler configured to execute the temperature control command and achieve a target mass flow rate of $CO_2$ from the $CO_2$ pump by achieving the target temperature value at the $CO_2$ pump.

In this aspect of the present technology, the temperature control command can be configured to control a temperature of a coolant to the $CO_2$ pump. In addition or alternatively, the temperature control command can be configured to prompt the $CO_2$ pump heater or cooler to pre-cool a solvent within the $CO_2$-based chromatography system to a minimum target temperature, and adjust the $CO_2$ pump temperature to achieve the target temperature value using a $CO_2$ pump heater. In addition or alternatively, the temperature control command can be configured to prompt the $CO_2$ pump heater or cooler to cool the $CO_2$ pump using a coolant, and adjust the $CO_2$ pump temperature to achieve the target temperature using a $CO_2$ pump heater. In addition or alternatively, retrieving the target temperature value can include accessing a lookup table including $CO_2$ density values as a function of temperature and pressure. In addition or alternatively, the temperature control module can be configured to receive a target mass flow rate at the computing system, wherein maintaining a constant mass flow rate includes maintaining the target mass flow rate of $CO_2$ from the $CO_2$ pump in response to the change in pressure within a $CO_2$ pump.

The above aspects of the technology provide one or more of the following advantages. Some embodiments of the technology allow for increased control of the mass flow rate of highly compressible fluids, such as $CO_2$. Some embodiments allow a user to dynamically adjust the temperature of a $CO_2$ pump in order to compensate for changes in pressure within the $CO_2$, thus preventing changes in the mass flow rate of $CO_2$.

BRIEF DESCRIPTION OF THE DRAWINGS

The skilled artisan will understand that the drawings are primarily for illustrative purposes and are not intended to limit the scope of the disclosure. The drawings are not necessarily to scale. In some instances, various aspects of the subject matter may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
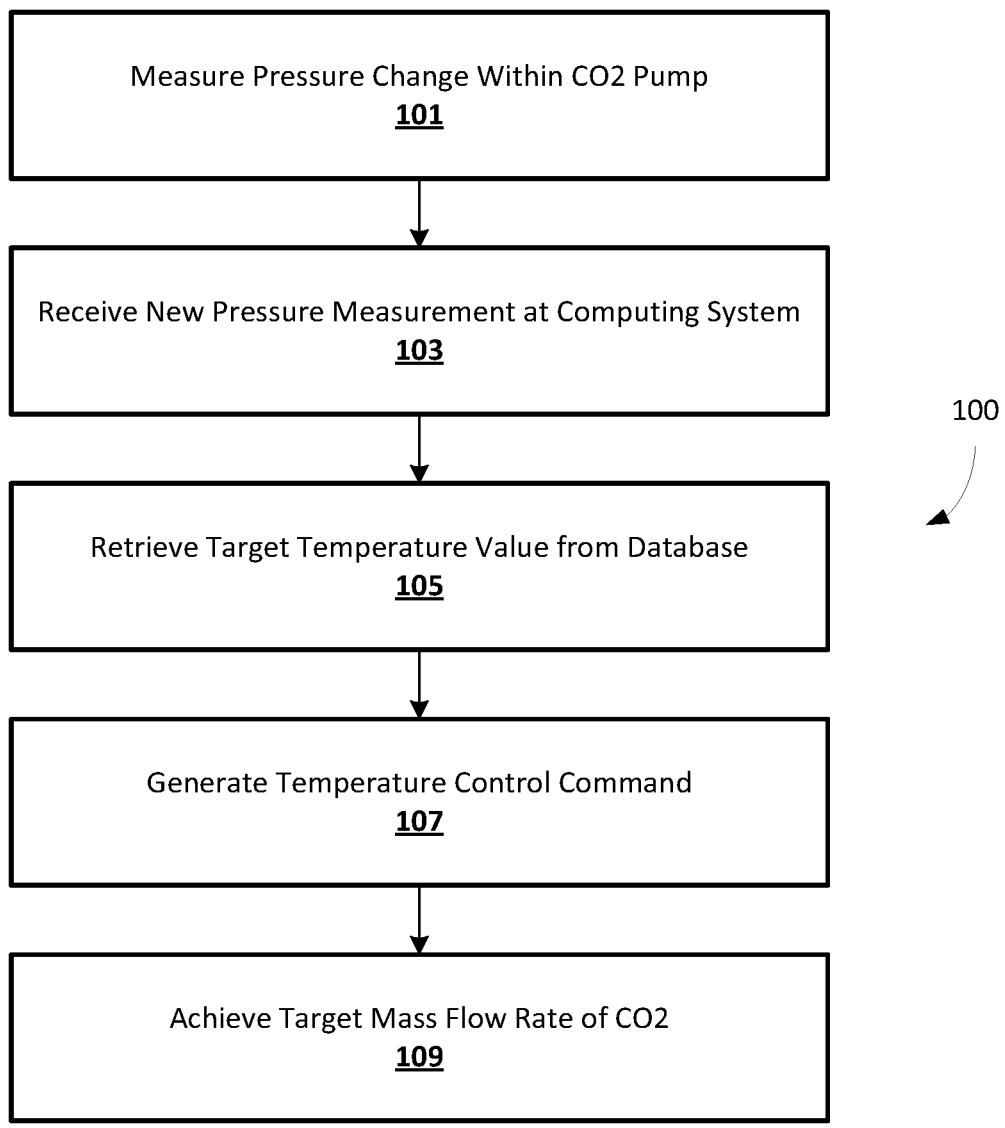
FIG. 1 is a flowchart illustrating an exemplary method for controlling mass flow rate within a $CO_2$-based chromatography system, according to an exemplary embodiment.

Following below are more detailed descriptions of various concepts and embodiments related to systems for controlling the temperature and mass flow rate of a $CO_2$ pump. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Methodologies, systems, apparatus, and non-transitory computer-readable media are described herein to facilitate controlling the temperature and mass flow rate of a $CO_2$ pump. As compared to liquid chromatography systems, controlling mass flow rates within a supercritical fluid chromatography system, such as a $CO_2$-based chromatography system, can be difficult due to the high compressibility and expandability of fluids such as $CO_2$. Many chromatographic pumps are configured to control the volumetric flow rate of fluids. However, while pumping highly compressible fluids, such as $CO_2$, a volumetric flow rate based pump could lead to changes in mass flow rates due to changes in delivery pressure. In some embodiments where a liquid organic solvent is added (e.g., methanol, water, etc.), changing $CO_2$ mass flow rates would lead to changing the mobile phase composition, in addition to net mass flow changes, leading to very different chromatography. Furthermore, in some embodiments the mobile phase composition may be dynamically adjusted during a separation, which may result in pressure changes within the system and changes in $CO_2$ mass flow rates, creating a composition gradient different from the intended one.

In general, the present technology maintains a constant mass flow rate of $CO_2$ from a $CO_2$ pump even while the delivery pressure of the $CO_2$ pump changes. This result can be achieved by utilizing various temperature control techniques to dynamically control the temperature of the $CO_2$ pump in response to changes in the delivery pressure. Due to the compressibility of $CO_2$, the density of $CO_2$ can change in response to changes in pressure. This can cause changes in the mass flow rate of $CO_2$ when the delivery pressure of the $CO_2$ pump changes. According to previous techniques, these changes in pressure could be accounted for by changing the stroke volume of the $CO_2$ pump in an attempt to maintain a constant mass flow rate. However, such techniques require dynamically controlling the $CO_2$ pump stroke volume. That is, each pump stroke is manipulated in an attempt to control mass flow rate. In addition to dynamically controlling the pump stroke volume, heaters or coolers can be installed on or near the pump heads in an attempt to maintain or to provide a substantially constant temperature while dynamically controlling the pump stroke volume.

According to embodiments of the present disclosure, a constant mass flow rate may be achieved by dynamically adjusting the temperature of the $CO_2$ pump in response to changes in delivery pressure, without the need to adjust or control the pump stroke volume. Specifically, because of the direct relationship between the temperature of the $CO_2$ pump head and the delivery pressure of the $CO_2$ pump with the $CO_2$ density at the pump head, a proportional change in pump head temperature can be used to account for a particular change in delivery pressure of the pump in order to maintain a constant density of $CO_2$, and therefore a constant $CO_2$ mass flow rate. For example, as the delivery pressure of the $CO_2$ pump increases, proportionally increasing the temperature of the $CO_2$ pump head can maintain a constant $CO_2$ mass flow rate. Likewise, as the delivery pressure of the $CO_2$ pump decreases, proportionally decreasing the temperature of the $CO_2$ pump head can maintain a constant $CO_2$ mass flow rate. The relationship between pump head temperature, pump pressure, and density of $CO_2$ is discussed in more detail below with reference to FIG. 2.

In some embodiments, the mass flow rate of a $CO_2$ pump is maintained constant by changing the pump head temperature in response to changes in the delivery pressure of the $CO_2$ pump. When a user sets a new chromatography method, the pressure at the pump head can change depending on the method setup. If the method is isocratic, the system may have a new pump head pressure that may stay constant during the method run. For gradient methods, the pump head pressure can change dynamically during the method run. In both isocratic and gradient methods, if the working fluid is a compressible fluid such as $CO_2$ (or including $CO_2$), changing the pressure of the $CO_2$ pump can lead to changing fluid density at the pump head, leading to changes in mass flow rate. In order to account for these pressure changes, $CO_2$ pumps can be configured to operate in a constant mass flow rate mode. In one embodiment of the present disclosure, the temperature of the $CO_2$ pump, and more specifically the pump head temperature, can be dynamically adjusted using a heater or a cooler in response to changing delivery pressures in order to maintain a constant mass flow rate. Because both temperature and pressure directly control the density of the fluid being pumped, high pressure at constant temperature leads to higher density, whereas high temperature at constant pressure leads to lower density. In order to maintain a constant density, when the pressure rises the temperature can be increased in order to bring down the density to its original value, or vice versa.

In some embodiments, the pressure of the $CO_2$ pump can be measured using a pressure sensor that is located within the $CO_2$ pump head so that it is in direct contact with the $CO_2$ within the pump. In other embodiments, the pressure sensor can be embedded in the pump head close to the fluid surface.

In some embodiments, the temperature of the pump head can be dynamically adjusted using one or more heaters or coolers. For example, a cooler can be used to control the temperature of the coolant applied to the $CO_2$ pump. In other embodiments, the cooler can pre-cool the $CO_2$ to a minimum target temperature before it enters the $CO_2$ pump, and an inline heater or other heating device can increase the temperature until the desired temperature is reached while running a constant flow of coolant to the $CO_2$ pump. In still other embodiments, the $CO_2$ pump can be cooled using a coolant and a heater can adjust the temperature of the $CO_2$ pump until the desired temperature is reached. In order to maintain a completely consistent mass flow rate of $CO_2$ with changing pump pressure, the temperature of the pump head can be controlled according to a strict temperature changing protocol. In other embodiments, the techniques described herein can be used to control and precisely adjust the mass flow rate in order to achieve a precise variable mass flow rate. The temperature of the $CO_2$ pump can be controlled, in some embodiments, using Peltier elements, thermoelectric cooling or heating elements, fluid heating channels, or fluid cooling channels.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary method 100 for controlling mass flow rate within a $CO_2$-based chromatography system, according to an exemplary embodiment. It will be appreciated that the method can be programmatically performed, at least in part, by one or more computer-executable processes executing on, or in communication with, one or more servers or other computing devices such as those described further below. In step 101, a pressure sensor is used to measure a change in pressure within a $CO_2$ pump. In some embodiments, the pressure sensor is ported directly into the pump head so that it is in direct contact with the solvent in the pump. In other embodiments, the pressure sensor can be embedded in the pump head close to the fluid surface.

In step 103, a computing system that is configured to be in communication with the pressure sensor receives a new pressure measurement from the pressure sensor. In some embodiments, the pressure sensor can be configured to continuously monitor the pressure at the pump head, or the pressure sensor can be configured to measure and store pressure readings at predetermined times or intervals. Pressure readings can be stored at a database or memory device associated with or in communication with the computing system, in some embodiments. In some cases, the pressure sensor can be configured to continuously monitor the pressure at the pump head, and if a sufficient increase or decrease in pressure is detected, a new pressure measurement is recorded and saved to a database. A pressure change threshold value can be set, in some embodiments, in order to determine how much of a change in pressure can occur before triggering the following steps to adjust the temperature of the $CO_2$ pump. This threshold value can be set or adjusted, in some embodiments, based on the sensitivity of the system or the importance of maintaining a highly consistent mass flow rate.

In step 105, the computing system retrieves a target temperature value corresponding to the new pressure measurement from a database. Because of the compressibility of $CO_2$, if temperature remains constant, the mass flow rate of $CO_2$ from the pump will increase as pressure increases. Therefore, in order to maintain a constant mass flow rate from the $CO_2$ pump, the temperature of the $CO_2$ pump can be increased. Because of this relationship between pump pressure, pump temperature, and mass flow rate (which is discussed in more detail below with reference to FIG. 2.), a database or lookup table can be generated that includes a listing of temperature values that correspond to a given pressure and mass flow rate for $CO_2$. The computing system can access this database or lookup table using, for example, a temperature control module, and retrieve the target temperature value corresponding to the new pressure measurement.

In step 107, the temperature control module of the computing system generates a temperature control command. The temperature control command is configured to control a $CO_2$ pump heater or cooler, or both, in order to achieve the target temperature value retrieved in step 105. In some embodiments, the temperature control command is configured to control the temperature of a coolant to the $CO_2$ pump. In other embodiments, the temperature control command is configured to pre-cool the solvent within the $CO_2$-based chromatography system to a minimum target temperature, and then adjust the $CO_2$ pump temperature to achieve the target temperature using a $CO_2$ pump heater. In still other embodiments, the temperature control command can be configured to cool the $CO_2$ pump using a coolant, and then adjust the temperature of the $CO_2$ pump using a $CO_2$ pump heater to achieve the target temperature.

In step 109, a target mass flow rate of $CO_2$ is achieved from the $CO_2$ pump by achieving the target temperature value at the $CO_2$ pump. In some embodiments, the temperature control module receives a target mass flow rate as an initial input value and is configured to achieve and maintain the mass flow rate of $CO_2$ from the $CO_2$ pump at the target level as the pressure within the $CO_2$ pump changes. The target mass flow rate can be, in some embodiments, a constant mass flow rate or a variable mass flow rate. Where the target mass flow rate is a variable mass flow rate, the variable mass flow rate can be accurately and precisely achieved by controlling the temperature of the $CO_2$ pump.

Figure 2:
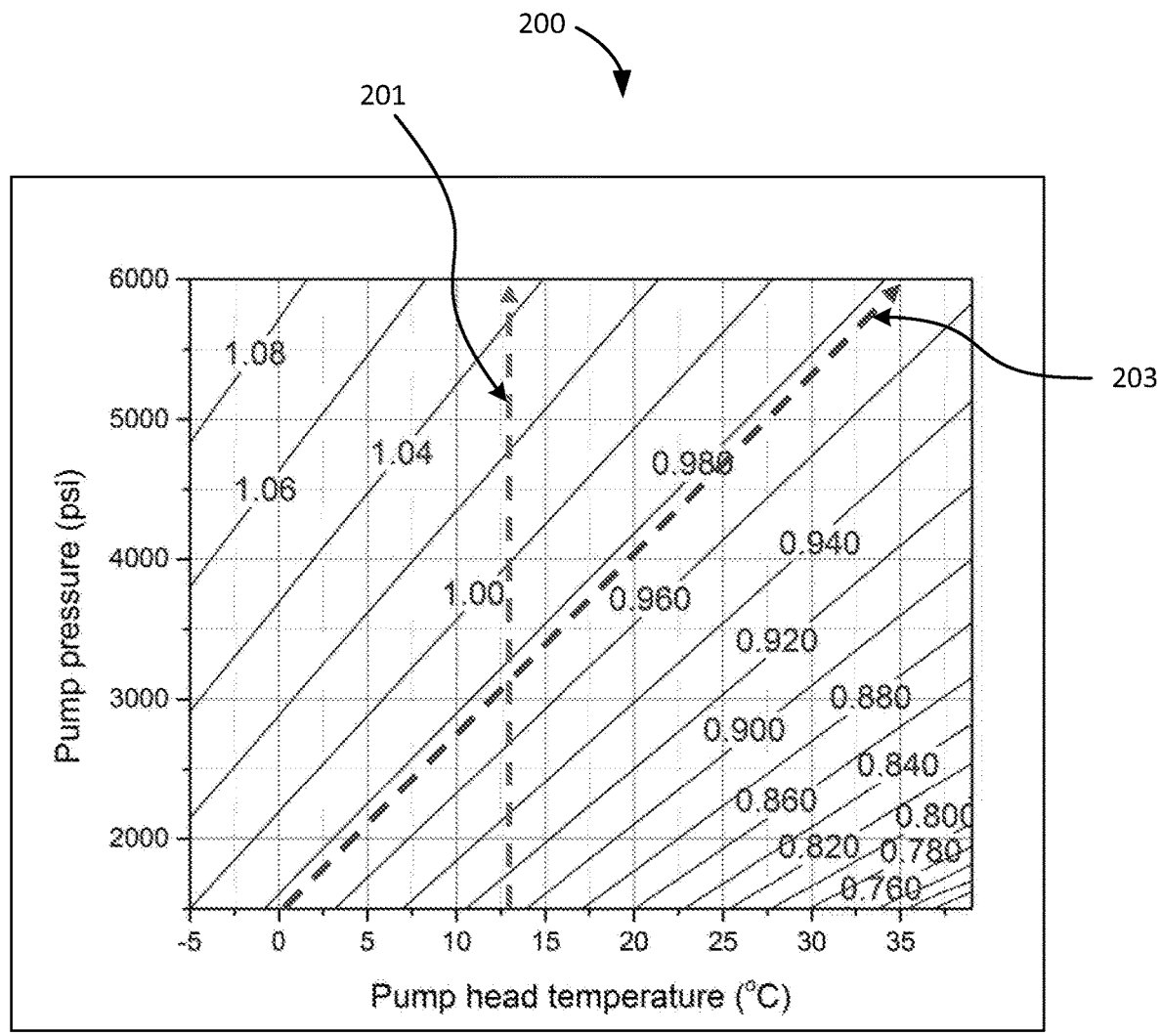
FIG. 2 is a graph of the density of $CO_2$ as a function of pressure and temperature.

FIG. 2 is a graph of the density of $CO_2$ as a function of pressure and temperature. Within the graph, each diagonal line represents the density of $CO_2$ in g/mL. In a standard system, whenever the outlet pressure of the $CO_2$ pump increases, the resultant mass flow rate increases, as illustrated by line 201. For example, if the pump head temperature is fixed at 13° C., increasing the pump head pressure from 1,500 to 6,000 psi results in an increase of $CO_2$ density from 0.91 to 1.04 g/mL. This increase would lead to a 15% increase in $CO_2$ mass flow rate. Such an increase would not only increase the net mass flow rate of the mobile phase, but also lead to changing its mass composition because the mass flow rate of a substantially incompressible liquid co-solvent is not changing. In order to account for these changes in mass flow rate and mass composition, the temperature of the pump head can be changed in order to maintain the same mass flow rate. For example, if the pump head temperature is dynamically increased from 0° C. to 35° C. as the pressure rises from 1,500 to 6,000 psi, as shown by line 203, then the density of $CO_2$ will remain constant at about 0.98 g/mL, and the mass flow rate and mass composition will also remain constant.

Figure 3:
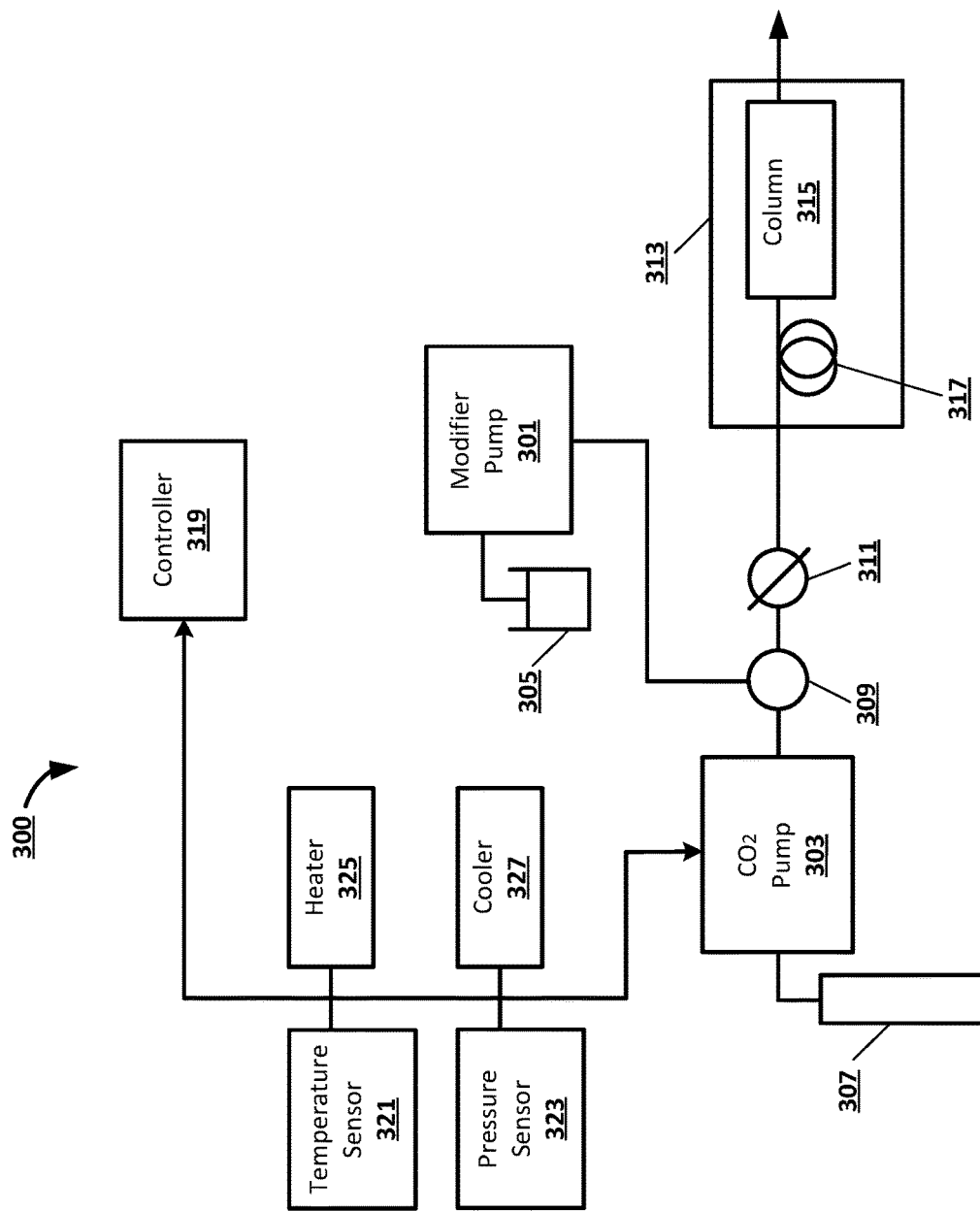
FIG. 3 is a block diagram illustrating an exemplary $CO_2$-based chromatography system configured to control the mass flow rate of a $CO_2$ pump, according to an exemplary embodiment.

FIG. 3 is a block diagram illustrating an exemplary $CO_2$-based chromatography system 300, according to an exemplary embodiment of the present disclosure. In this example, a modifier pump 301 is used to pump a liquid modifier from a reservoir 305 to a mixer 309, and a $CO_2$ pump 303 is used to pump $CO_2$ from a $CO_2$ container 307 to the mixer 309. In this technological field, $CO_2$ pumps are pumps that are able to adequately pump $CO_2$ and often require cooling to maintain the $CO_2$ in a liquid-like state. The liquid modifier and $CO_2$ mixture can be injected to a chromatography column 315 via an injector 311. In this example, the $CO_2$-based chromatography column 315 is located within a column oven 313, which includes preheating elements 317.

The $CO_2$-based chromatography system 300 also includes a controller 319 that is in communication with, at least, the $CO_2$ pump 303, a temperature sensor 321, a pressure sensor 323, a heater 325, and a cooler 327. The controller 319 can be configured to control the operation of the heater 325 and the cooler 327, in some embodiments, in order to adjust the temperature of the $CO_2$ pump and maintain a constant mass flow rate of $CO_2$ as pressures change in the $CO_2$ pump. As discussed above, in some embodiments the pressure sensor 323 is ported directly into the pump head so that it is in direct contact with the solvent in the pump. In other embodiments, the pressure sensor can be embedded in the pump head close to the fluid surface. The temperature sensor 321 is configured to monitor the temperature of the $CO_2$ pump, and the controller 319 is configured to control the heater 325 and the cooler 327 in order to change the temperature of the $CO_2$ pump. In some embodiments, the cooler 327 includes one or more coolant channels or tubes located at the $CO_2$ pump that can cool the pump head to a desired temperature. In other embodiments, the cooler 327 is configured to pre-cool the $CO_2$ or the pump head to a minimum target temperature, and the heater 325 is used to increase the temperature of the pump head until the desired temperature is achieved.

Figure 4:
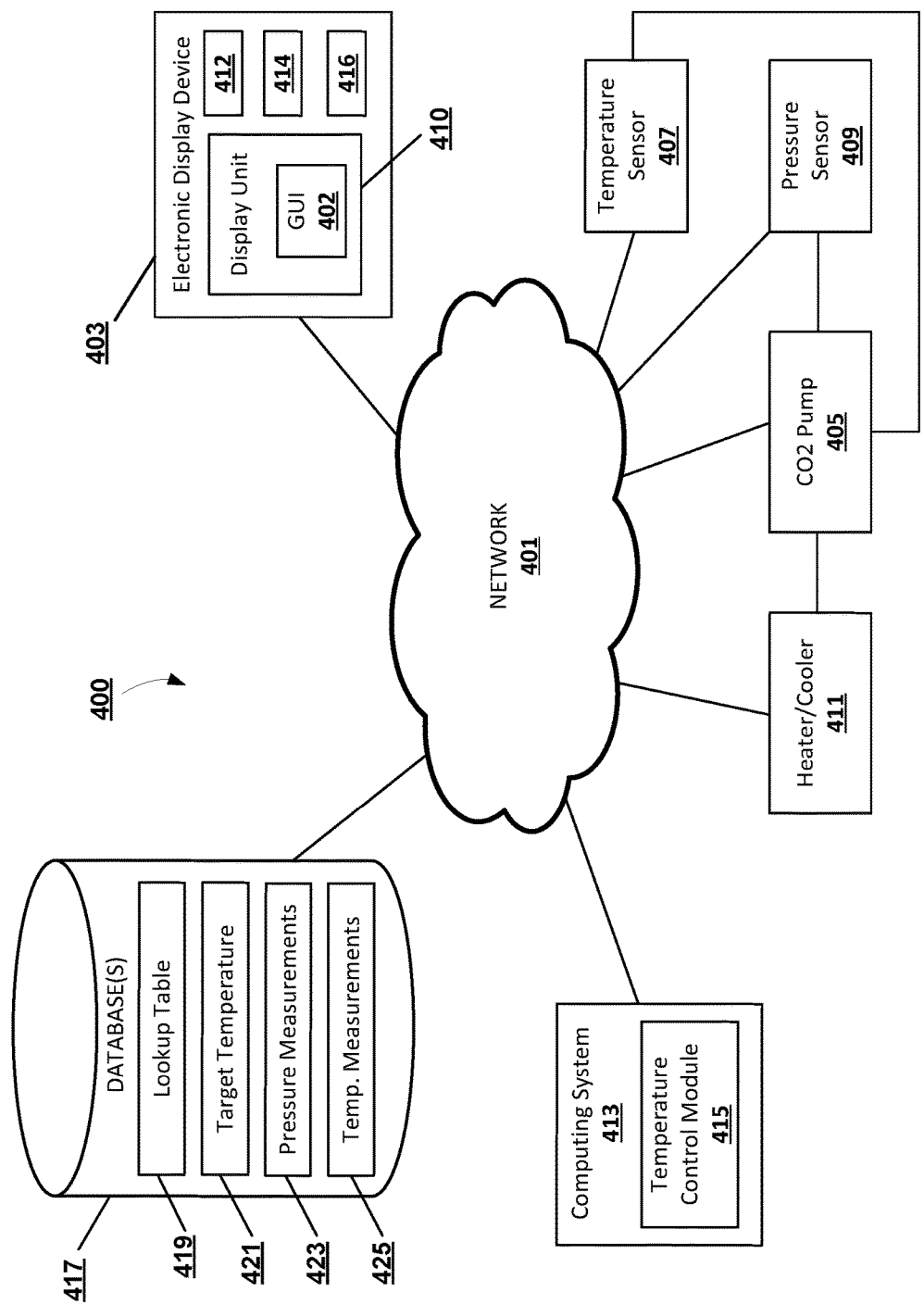
FIG. 4 is a diagram of an exemplary network environment suitable for a distributed implementation of an exemplary embodiment.

FIG. 4 illustrates a network diagram depicting a system 400 suitable for a distributed implementation of an exemplary embodiment of the present disclosure. The system 400 can include a network 401, electronic display device 403, $CO_2$ pump 405, temperature sensor 407, pressure sensor 409, heater/cooler 411, computing system 413, and database 417. As will be appreciated, various distributed or centralized configurations may be implemented without departing from the scope of the present disclosure. In exemplary embodiments, the computing system 413 includes a temperature control module 415 configured to execute all or portions of the method described above in FIG. 1.

The database 417 can store the lookup table 419, target temperature values 421, pressure measurements 423, temperature measurements 425, and any other data/information used to implement exemplary embodiments of the systems and methods described herein. The database 417 can be updated by a user or automatically at any suitable time to add, delete, or update one or more items in the databases. In some embodiments, the database 417 can include one or more storage devices, such as a hard-drive, CD-ROM, or other non-transitory computer readable media, for storing data and computer-readable instructions and/or software that can implement exemplary embodiments of the methods and systems as taught herein, or portions thereof.

In exemplary embodiments, the electronic device 403 may include a display unit 410, which can display a GUI 402 to a user of the electronic device 403. The electronic device 403 can also include a memory 412, processor 414, and a wireless interface 416. In some embodiments, the electronic device 403 may include, but is not limited to, work stations, computers, general purpose computers, Internet appliances, hand-held devices, wireless devices, portable devices, wearable computers, cellular or mobile phones, portable digital assistants (PDAs), smart phones, tablets, laptops, desktops, multi-processor systems, microprocessor-based or programmable consumer electronics, network PCs, and the like. The electronic device 403 can be used to monitor the system and to set or adjust the target mass flow rate, in some embodiments.

In exemplary embodiments, the electronic device 403, $CO_2$ pump 405, temperature sensor 407, pressure sensor 409, heater/cooler 411, computing system 413, and database 417 can be in communication with each other via the communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In one embodiment, the electronic device 403, $CO_2$ pump 405, temperature sensor 407, pressure sensor 409, heater/cooler 411, computing system 413, and database 417 can transmit instructions to each other over the communication network 401. In exemplary embodiments, the values within the lookup table 419, the target temperature values 421, pressure measurements 423, and temperature measurements 425 can be stored at the database 417 and received at the electronic device 403, and/or the computing system 413 in response to a service performed by a database retrieval application.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. As one particular example, while the technology has been described with respect to flow streams/extraction solvents containing CO2, it is possible that CO2 could be replaced with other fluids including xenon, nitrogen, SF6, cFCs, FCs, nitrous oxide, argon, and possible water under supercritical conditions. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A method for controlling mass flow rate within a $CO_2$-based chromatography system comprising:

measuring a change in pressure within a $CO_2$ pump using a pressure sensor;

receiving a new pressure measurement at a computing system from the pressure sensor;

retrieving a target temperature value corresponding to the new pressure measurement from a database using the computing system;

generating a temperature control command, using the computing system, the temperature control command configured to control a $CO_2$ pump heater or cooler in order to achieve the target temperature value at the $CO_2$ pump; and maintaining a constant mass flow rate of $CO_2$ from the $CO_2$ pump by achieving the target temperature value at the $CO_2$ pump.

2. The method of claim 1, wherein the temperature control command is configured to control a temperature of a coolant to the $CO_2$ pump.

3. The method of claim 1, wherein the temperature control command is configured to:

pre-cool a solvent within the $CO_2$-based chromatography system to a minimum target temperature; and adjust the $CO_2$ pump temperature to achieve the target temperature value using a $CO_2$ pump heater.

4. The method of claim 1, wherein the temperature control command is configured to:

cool the $CO_2$ pump using a coolant; and adjust the $CO_2$ pump temperature to achieve the target temperature using a $CO_2$ pump heater.

5. The method of claim 1, wherein retrieving the target temperature value includes accessing a lookup table including $CO_2$ density values as a function of temperature and pressure.

6. The method of claim 1, further comprising receiving a target mass flow rate at the computing system, and wherein maintaining a constant mass flow rate includes maintaining the target mass flow rate of $CO_2$ from the $CO_2$ pump in response to the change in pressure within a $CO_2$ pump.

7. A system for controlling mass flow rate from a $CO_2$ pump, the system comprising:

a pressure sensor configured to measure a change in pressure within the $CO_2$ pump;

a computing system configured execute a temperature control module configured to:

receive a new pressure measurement from the pressure sensor;

retrieve a target temperature value corresponding to the new pressure measurement from a database; and generate a temperature control command configured to control a $CO_2$ pump heater or cooler in order to achieve the target temperature value at the $CO_2$ pump; and the $CO_2$ pump heater or cooler configured to execute the temperature control command and achieve a target mass flow rate of $CO_2$ from the $CO_2$ pump by achieving the target temperature value at the $CO_2$ pump.

8. The system of claim 7, wherein the temperature control command is configured to control a temperature of a coolant to the $CO_2$ pump.

9. The system of claim 7, wherein the temperature control command is configured to prompt the $CO_2$ pump heater or cooler to:

pre-cool a solvent within the $CO_2$-based chromatography system to a minimum target temperature; and adjust the $CO_2$ pump temperature to achieve the target temperature value using a $CO_2$ pump heater.

10. The system of claim 7, wherein the temperature control command is configured to prompt the $CO_2$ pump heater or cooler to:

cool the $CO_2$ pump using a coolant; and adjust the $CO_2$ pump temperature to achieve the target temperature using a $CO_2$ pump heater.

11. The system of claim 7, wherein retrieving the target temperature value includes accessing a lookup table including $CO_2$ density values as a function of temperature and pressure.

12. The system of claim 7, wherein the temperature control module is further configured to receive a target mass flow rate at the computing system, and wherein maintaining a constant mass flow rate includes maintaining the target mass flow rate of $CO_2$ from the $CO_2$ pump in response to the change in pressure within a $CO_2$ pump.

* * * * *